United States Patent
Robles

(10) Patent No.: US 6,970,261 B1
(45) Date of Patent: Nov. 29, 2005

(54) PRINTING SYSTEM AND METHOD WITH PRINT JOB DISTRIBUTION AMONG A NUMBER OF PRINTERS

(75) Inventor: Rogelio Robles, Jalisco (MX)

(73) Assignee: Hewlett-Packard Development Company, L.P., Houston, TX (US)

( * ) Notice: Subject to any disclaimer, the term of this patent is extended or adjusted under 35 U.S.C. 154(b) by 734 days.

(21) Appl. No.: 09/613,700

(22) Filed: Jul. 11, 2000

(51) Int. Cl.[7] ............................ G06F 13/00; G06F 3/12
(52) U.S. Cl. ..................................... 358/1.15; 358/1.14
(58) Field of Search .............................. 358/1.15, 1.14, 358/1.16, 1.17, 1.18, 1.13, 1.11, 1.6; 350/1.2, 350/501, 401

(56) References Cited

U.S. PATENT DOCUMENTS

| 5,179,637 | A | 1/1993 | Nardozzi | 395/114 |
|---|---|---|---|---|
| 5,465,213 | A | 11/1995 | Ross | 364/468 |
| 5,559,933 | A | 9/1996 | Boswell | 395/114 |
| 5,859,711 | A | 1/1999 | Barry et al. | 358/296 |
| 6,012,890 | A | 1/2000 | Celorio Garrido | 412/19 |
| 6,348,971 | B2 * | 2/2002 | Owa et al. | 358/1.15 |

FOREIGN PATENT DOCUMENTS

| EP | 0545261 A1 | 6/1993 |
|---|---|---|
| JP | 59-180746 A | 10/1984 |
| JP | 5-73232 A | 3/1993 |
| JP | 10-31570 A | 2/1998 |

* cited by examiner

Primary Examiner—Douglas Tran

(57) ABSTRACT

A system for printing a print job includes a plurality of printers and a print job distribution system which distributes the print job among a number of printers of the plurality of printers. The print job distribution system distributes the print job such that the number of printers complete the print job at substantially one time.

26 Claims, 4 Drawing Sheets

PRINTING SYSTEM AND METHOD WITH PRINT JOB DISTRIBUTION AMONG A NUMBER OF PRINTERS

THE FIELD OF THE INVENTION

The present invention relates generally to a printing system and, more particularly, to a system for distributing a print job among a number of printers.

BACKGROUND OF THE INVENTION

With a conventional printing system, a single print job is typically processed by a single printer. Therefore, processing and printing time for the printing system is limited by the single printer. In addition, printing ability of the printing system is also limited by the single printer. The single printer, for example, may not accommodate all of the printing requirements such as text, graphics, color, etc. which may be required by the single print job.

To increase printing time and printing ability, therefore, printing systems have been developed which include multiple printers. Thus, a single print job may be distributed among multiple printers. If the print job is distributed among multiple printers, however, portions of the print job may be completed before others. As such, printers which have finished printing remain idle while the print job is being completed. Thus, idle printers are underutilized and overall processing time for the print job is hindered. In addition, subsequent processing of the print job is delayed. Collation of the print job, for example, cannot be performed until all portions of the print job are completed.

Accordingly, a need exists for a printing system which distributes a single print job among a plurality of printers, such that the printers complete the print job at substantially one time.

SUMMARY OF THE INVENTION

One aspect of the present invention provides a system for printing a print job. The system includes a plurality of printers and a print job distribution system which assess characteristics of the print job and distributes the print job among a number of printers of the plurality of printers based on the characteristics of the print job such that the number of printers complete the print job at substantially one time.

In one embodiment, the print job distribution system includes a print job assessment system which assesses the characteristics of the print job, a printer ability assessment system which assesses a printing ability of the plurality of printers to print the print job, and a print job allocation system which allocates the print job among the number of printers based on the characteristics of the print job and the printing ability of the plurality of printers. In one embodiment, the print job allocation system divides the print job into a number of print job portions each having a print job weight and allocates the number of print job portions among the number of printers such that all the print job portions are finished at substantially the same time.

In one embodiment, the number of print job portions includes a number of sequential print job portions. In one embodiment, the print job weight of each of the number of print job portions is equal. In one embodiment, the print job weight of each of the number of print job portions is not equal.

In one embodiment, the printing ability of each of the plurality of printers is equal. In one embodiment, the printing ability of each of the plurality of printers is not equal.

In one embodiment, the characteristics of the print job include at least one of a file size of the print job, a format of the print job, a layout of the print job, and a content of the print job.

In one embodiment, the characteristics of the print job include at least one of a paper size and margins for the print job, a number of lines of text in the print job, a number of words in the print job, a number of characters in the print job, a font size and type of the print job, and an image size in the print job.

In one embodiment, the print job allocation system minimizes a time required for printing the print job. In one embodiment, the print job distribution system monitors a status of the print job and a performance of the plurality of printers.

Another aspect of the present invention provides a method of printing a print job. The method includes the steps of providing a plurality of printers, assessing characteristics of the print job, and distributing the print job among a number of printers of the plurality of printers based on the characteristics of the print job such that the number of printers complete the print job at substantially one time.

Another aspect of the present invention provides a system for producing a book on-demand. The system includes a processing system adapted to receive and process a book request for the book, a book block preparation system which prepares a book block of the book in response to a book body preparation command of the processing system, a book cover preparation system which prepares a book cover of the book in response to a book cover preparation command of the processing system, and a book finishing system which assembles the book block and the book cover to form the book. In one embodiment, the book block preparation system prints the book block as a print job. As such, the book block preparation system includes a plurality of printers and a print job distribution system which distributes the print job among a number of printers of the plurality of printers, wherein the number of printers complete the print job at substantially one time.

Another aspect of the present invention provides a method of producing a book on-demand. The method includes the steps of receiving and processing a book request for the book, preparing a book block of the book in response to a book body preparation command of the processing system, preparing a book cover of the book in response to a book cover preparation command of the processing system, and assembling the book block and the book cover to form the book. In one embodiment, the step of preparing the book block includes printing the book block as a print job. As such, the step of preparing the book block includes providing a plurality of printers and distributing the print job among a number of printers of the plurality of printers, wherein the number of printers complete the print job at substantially one time.

The present invention provides a printing system which distributes a print job among a plurality of printers such that the printers complete the print job at substantially one time. As such, the printing system minimizes an idle time for the printers, and therefore, maximizes utilization of the printers.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
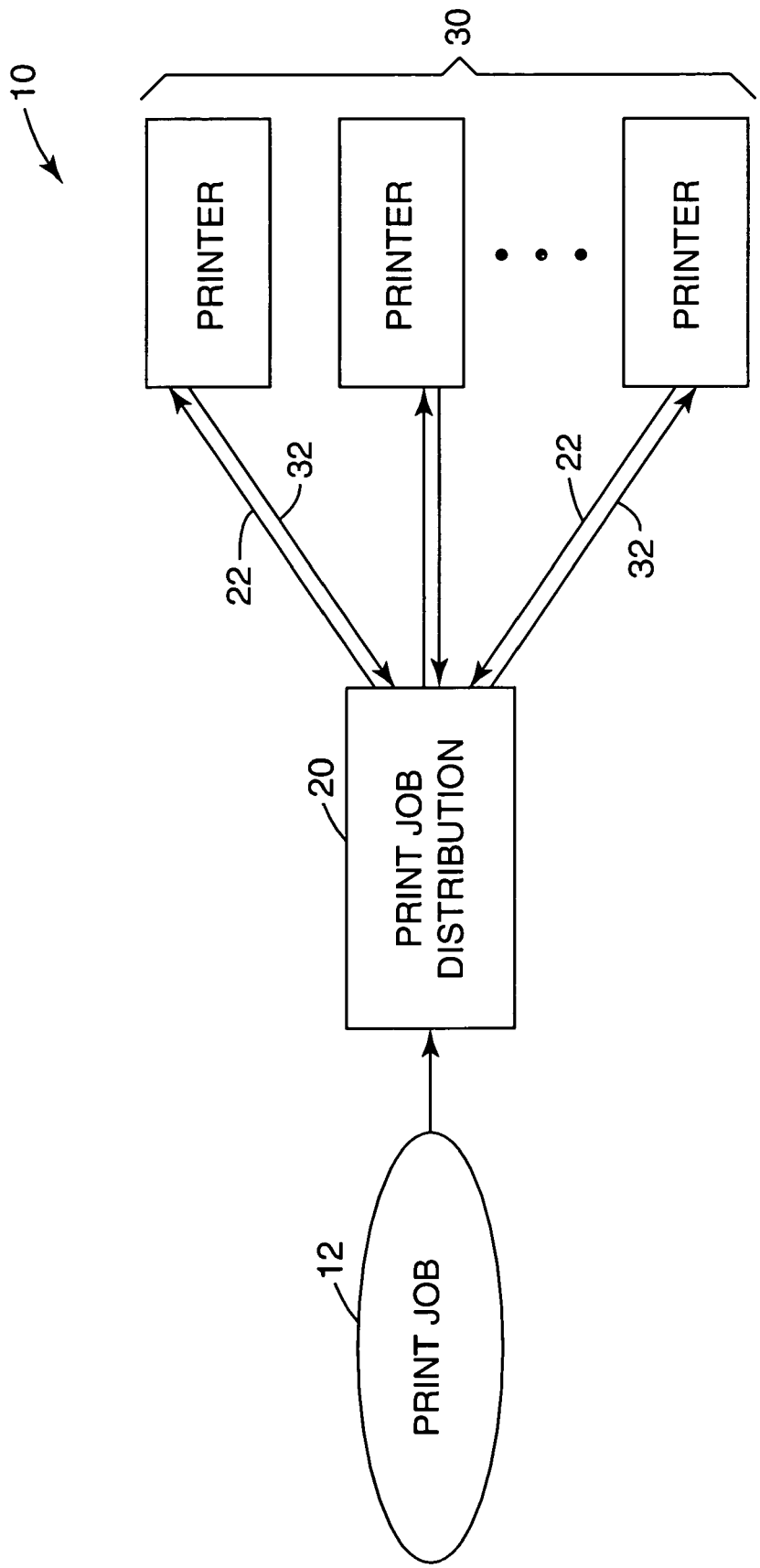
FIG. 1 is a block diagram illustrating a portion of a distributed printing system according to the present invention.

A distributed printing system according to the present invention is illustrated generally at 10 in FIG. 1. Distributed printing system 10 provides a system for distributing a print job among a number of printers such that the printers complete the print job at substantially one time. Distributed printing system 10 as well as other embodiments of the distributed printing system according to the present invention include several main components, one or more of which may include hardware and/or software. The software components of distributed printing system 10 according to the present invention system run on one or more computer and/or server systems capable of performing logical operations. Programming languages suitable for use with the present invention will become apparent to those skilled in the art after reading the present application.

In one exemplary embodiment, as illustrated in FIG. 1, distributed printing system 10 includes a print job distribution system 20 and a plurality of printers 30 which print a print job 12. Print job 12 is created, for example, by one or more computer and/or server systems which communicate with print job distribution system 20. Thus, print job distribution system 20 includes hardware and/or software which performs logical operations on print job 12. As such, print job distribution system 20 receives print job 12 and controls printing of print job 12 by printers 30. More specifically, print job distribution system 20 distributes print job 12 among a number of the printers 30.

Print job distribution system 20 measures a weight or print demand of print job 12, as described below, and distributes print job 12 among a number of the printers 30, as represented by arrow 22. Printers 30 include any number of printing devices each communicating with print job distribution system 20 in a parallel manner. In addition, printers 30 may include printing devices having varying capabilities including printing speed, printing resolution, black-and-white and/or color printing, etc. Printers 30 communicate with print job distribution system 20, as represented by arrow 32. As such, print job distribution system 20 receives operational data from printers 30. Accordingly, print job distribution system 20 monitors a status of print job 12 when being printed by printers 30 and provides feedback of an ability and/or performance of printers 30 in printing print job 12.

Figure 2:
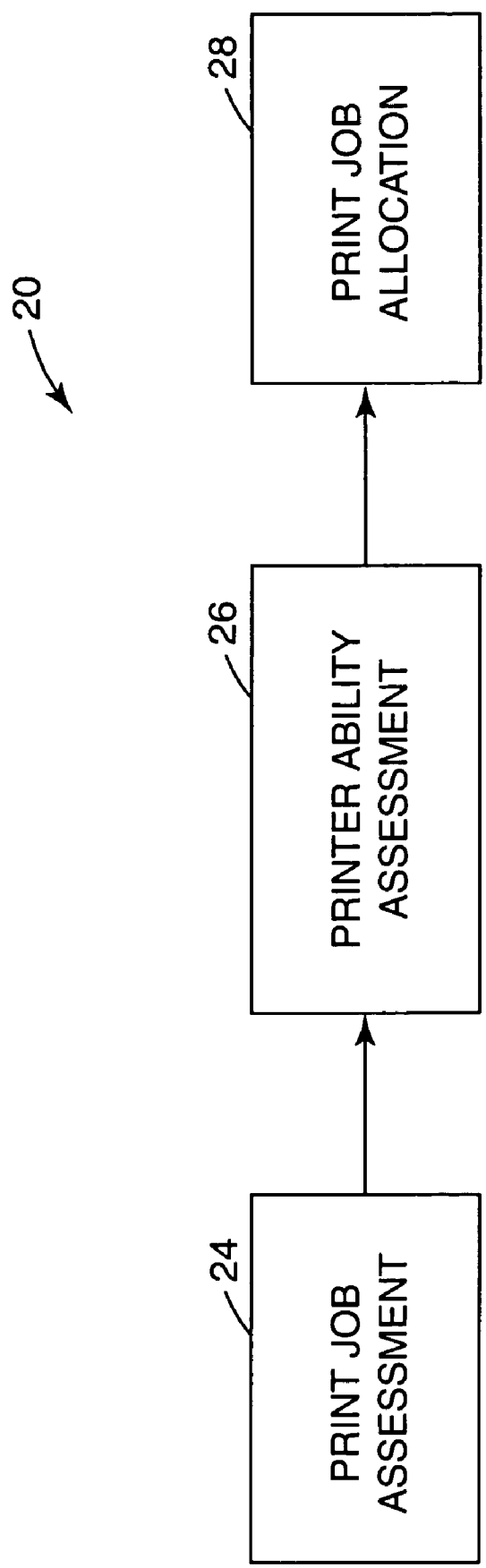
FIG. 2 is a block diagram illustrating one exemplary embodiment of a print job distribution system of the system of FIG. 1.

In one exemplary embodiment, as illustrated in FIG. 2, print job distribution system 20 includes a print job assessment system 24, a printer ability assessment system 26, and a print job allocation system 28. Print job assessment system 24 assesses the weight of print job 12, printer ability assessment system 26 assesses an ability of printers 30 to print print job 12, and print job allocation system 28 allocates print job 12 among printers 30. Print job assessment system 24 and printer ability assessment system 26 both communicate with print job allocation system 28. As such, print job allocation system 28 divides print job 12 among a number of the printers 30 based on print job assessment system 24 and printer ability assessment system 26.

To assess the weight of print job 12, print job assessment system 24 assesses print characteristics of print job 12. Print characteristics of print job 12 include, for example, a file size of print job 12, a format of print job 12, a layout of print job 12, and/or a content of print job 12. The format of print job 12 includes, for example, a file type of print job 12. The layout of print job 12 includes, for example, a paper size and margins for print job 12. The content of print job 12 includes, for example, text, graphics, images, tables, etc. in print job 12. Thus, the content of print job 12 includes, for example, a number of lines of text in print job 12, a number of words in print job 12, a number of characters in print job 12, a font type and size of print job 12, and/or whether print job 12 is in black-and-white or color. By analyzing print characteristics of print job 12, therefore, print job assessment system 24 can establish the weight of print job 12.

To assess a printing ability of printers 30, printer ability assessment system 26 considers printing capabilities of printers 30. Printing capabilities of printers 30 include, for example, a number of pages printed per minute for each of the printers 30, black-and-white or color printing capabilities of printers 30, and/or printing resolution of printers 30. It is within the scope of the present invention for printing capabilities of printers 30 to be equal and/or unequal. For example, one of the printers 30 may be a black-and-white printer which is not capable of printing color or one of the printers 30 may be a high-speed printer which is capable of printing more pages per minute than one or more other printers 30. Thus, distributed printing system 10 can accommodate a variety of print characteristics such as format, layout, and/or content of print job 12.

Print job allocation system 28 divides print job 12 into a number of print job portions based on the weight of print job 12 and the printing abilities of printers 30. Each of the print job portions have a print job weight such that a sum of the print job portions is equal to print job 12. In dividing print job 12 into the number of print job portions, print job allocation system 28 considers processing and printing times of print job 12 and printers 30. Thus, print job allocation system 28 allocates the print job portions among a number of the printers 30 such that all of the print job portions are finished at substantially the same time.

The number of printers 30 among which print job 12 is allocated includes any number of the printers 30. For example, print job allocation system 28 may allocate print job 12 among only one of the printers 30, all of the printers 30, or any number of printers 30 therebetween. It is within the scope of the present invention for the print job weight of each of the print job portions to be equal and/or unequal. For example, the print job weight of one of the print job portions may be greater than the print job weight of one or more other print job portions. Based on the printing capabilities of printers 30, however, all of the print job portions are completed at substantially the same time.

Figure 3:
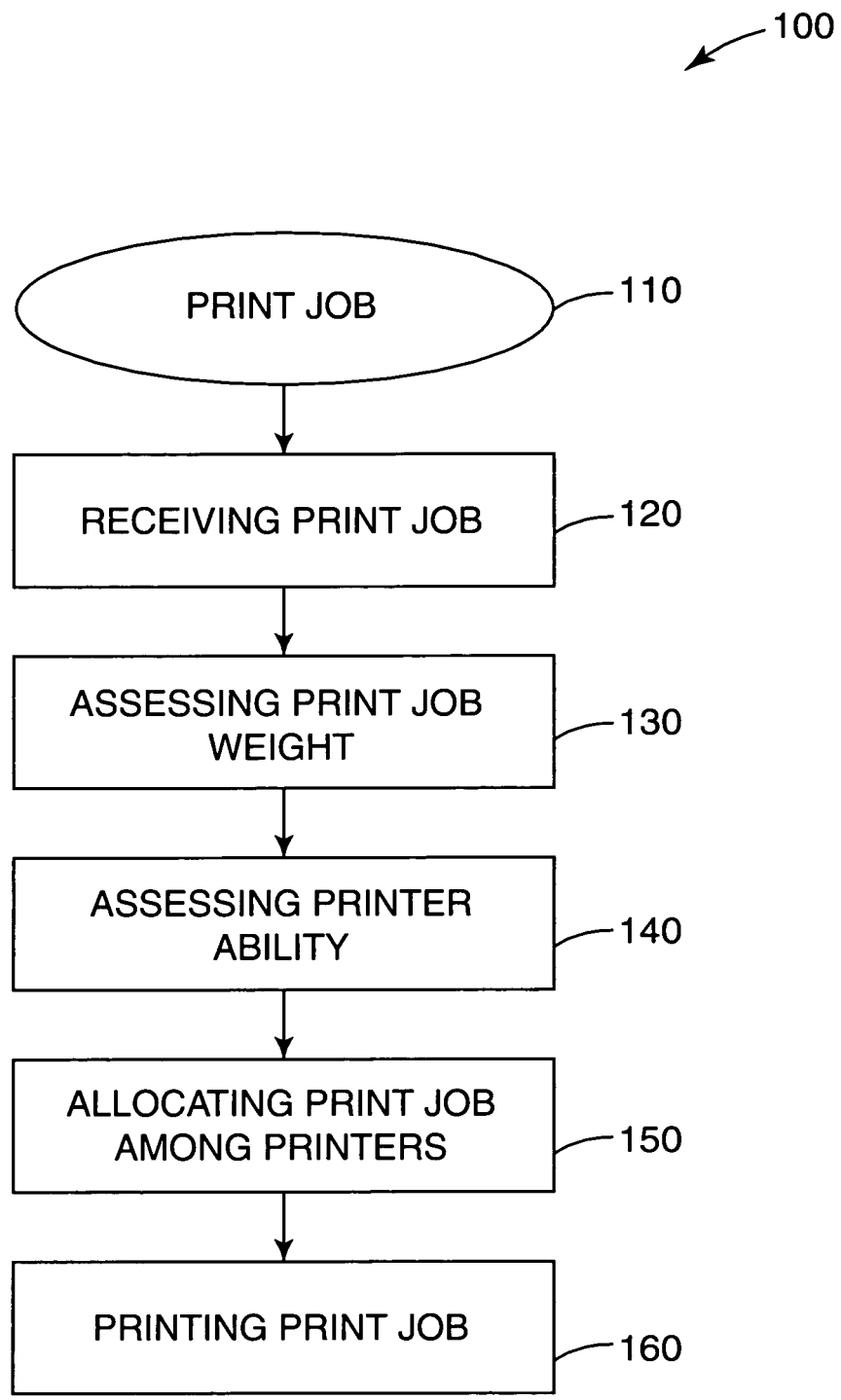
FIG. 3 is a flow diagram illustrating one exemplary embodiment of a method of distributing a print job according to the present invention.

In FIG. 3, a flow diagram illustrating one exemplary embodiment of a method of printing print job 12 according to the present invention is illustrated generally at 100. Reference is also made to FIGS. 1 and 2. At step 110, print job 12 is generated, for example, by a computer system. As such, at step 120, print job 12 is received and processed, for example, by print job distribution system 20. Accordingly, in step 130, the weight of print job 12 is assessed, for example, by print job assessment system 24. In addition, in step 140, an ability of printers 30 to print print job 12 is assessed, for example, by printer ability assessment system 26. Thereafter, in step 150, print job 12 is allocated among a number of the printers 30, for example, by print job allocation system 28. Thus, in step 160, print job 12 is printed such that the number of the printers 30 complete print job 12 at substantially one time.

By distributing a print job among a plurality of printers such that the printers complete the print job at substantially one time, distributed printing system minimizes an idle time for the printers and, therefore, maximizes utilization of the printers.

Figure 4:
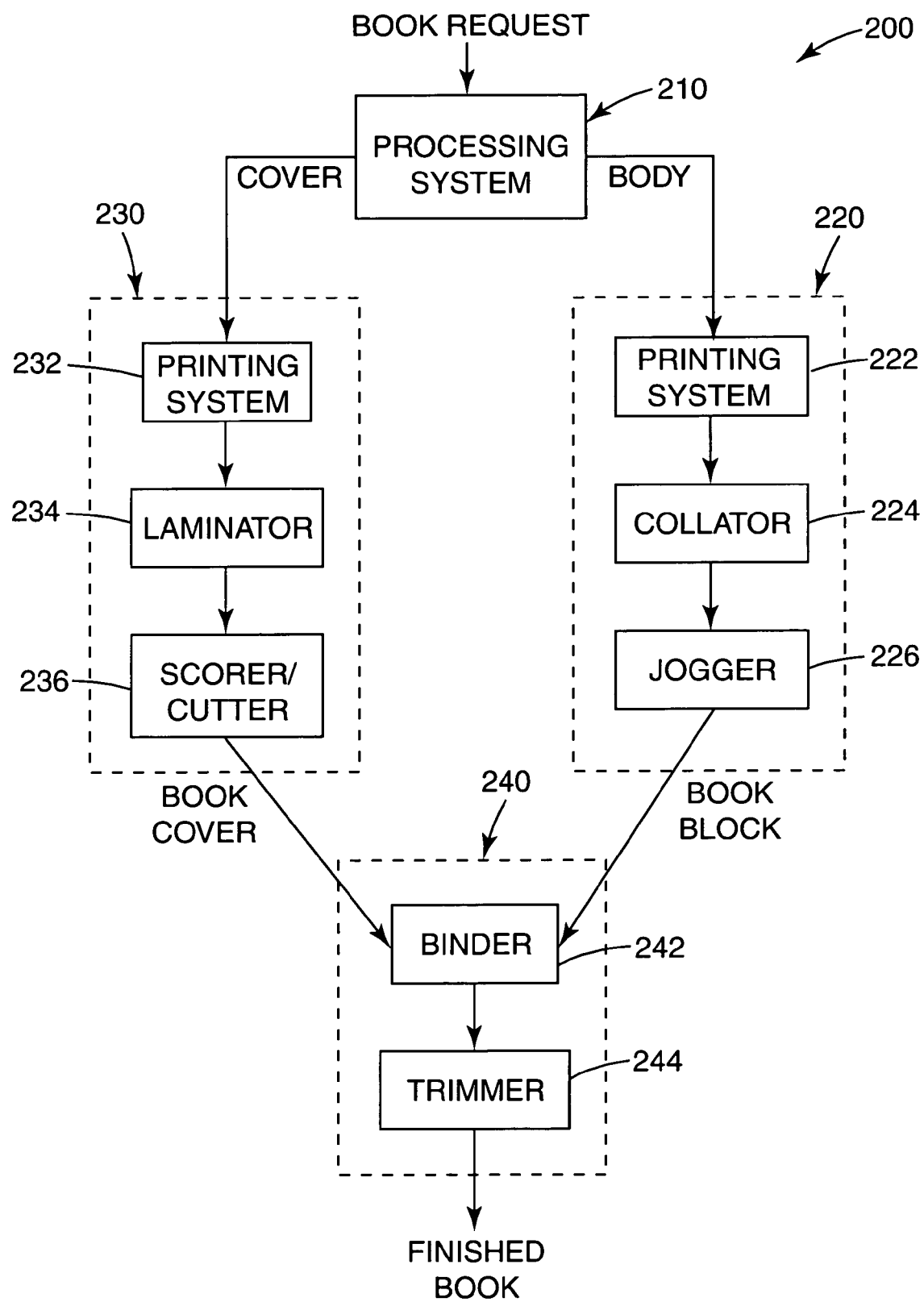
FIG. 4 is a block diagram illustrating one exemplary embodiment of a books-on-demand system including a distributed printing system according to the present invention.

In one illustrative embodiment, distributed printing system 10 is included in a books-on-demand system illustrated generally at 200 in FIG. 4. Books-on-demand system 200 receives orders for single and/or multiple copies of a book and produces the book on-demand. More specifically, books-on-demand system 200 retrieves an electronic file of the book and then prints and binds a copy of the book.

In one exemplary embodiment, books-on-demand system 200 includes a processing system 210, a book block preparation system 220, a book cover preparation system 230, and a book finishing system 240. In one exemplary embodiment, processing system 210 includes hardware and software for receiving and processing a book request. Processing system 210 retrieves an electronic file of a book being requested and produces a print command for a body of the book and a print command for a cover of the book.

In response to the print commands, book block preparation system 220 and book cover preparation system 230 prepare a book block and a book cover, respectively. Thereafter, book finishing system 240 assembles the book block and the book cover to form a finished book. The book cover includes a sheet or piece of material cut to a desired size and is formed from a suitable sheet material such as paper, cardboard, and/or plastic film. The book cover can also include a cover image in the form of characters and/or graphics as is well known in the art. The book block includes a plurality of sheets of paper which form a body of the book. The body of the book includes, for example, a table of contents, text, index, etc.

In one exemplary embodiment, book block preparation system 220 includes a printing system 222, a collator 224, and a jogger 226. To facilitate printing of the book block as a print job, printing system 222 includes distributed printing system 10. Printing system 222, therefore, includes print job distribution system 20 and the plurality of printers 30. As such, print job distribution system 20 measures a weight or print demand of the book block and distributes the print job for the book block among a number of the printers 30. As such, printing system 222 prints the body of the book in a number of print job portions on several sheets of paper such that all of the print job portions are finished at substantially the same time. Thereafter, collator 224 collates the print job portions and the sheets of paper and jogger 226 vibrates or shakes the sheets to align the edges of the paper in forming the book block.

In one exemplary embodiment, book cover preparation system 230 includes a printing system 232, a laminator 234, and a scorer/cutter 236. Printing system 232 includes a color printer which prints the book cover. Laminator 234 laminates the book cover and scorer/cutter 236 scores the book cover with crease lines which facilitate bending of the book cover along a spine of the book block.

In one exemplary embodiment, book finishing system 240 includes a book binder 242 and a book trimmer 244. As such, the book cover is registered in book binder 242 and the book block is positioned on the book cover. Then, the book block is bound with the book cover by book binder 242 as is well known in the art. Thereafter, book trimmer 244 trims the book cover if necessary. Thus, the finished book is produced.

By allocating the print job portions among a number of the printers 30 such that all of the print job portions are finished at substantially the same time, distributed printing system 10 minimizes an idle time for printers 30 and, therefore, maximizes utilization of printers 30. In addition, by distributing the print job for the book block among a number of the printers 30, distributed printing system 10 increases throughput of printing system 222 and, therefore, book block preparation system 220. Thus, book block preparation system 220 prepares the book block while book cover preparation system 230 prepares the book cover. Book finishing system 240, therefore, can immediately assemble the book block and the book cover to form the finished book.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A system for printing a print job, the system comprising:
   a plurality of printers; and
   a print job distribution system which assesses characteristics of the print job and a printing ability of the plurality of printers, divides the print job into a number of print job portions each having a print job weight, and distributes the print job portions among a number of printers of the plurality of printers based on the characteristics of the print job and the printing ability of the plurality of printers,
   wherein the number of printers complete the print job portions at substantially the same time, and
   wherein the print job weight of each of the print job portions is substantially equal.

2. The system of claim 1, wherein the print job distribution system includes a print job assessment system which assesses the characteristics of the print job, a printer ability assessment system which assesses a printing ability of the plurality of printers to print the print job, and a print job allocation system which allocates the print job among the number of printers based on the characteristics of the print job and the printing ability of the plurality of printers.

3. The system of claim 2, wherein the print job allocation system divides the print job into a number of print job portions each having a print job weight and allocates the number of print job portions among the number of printers such that all the print job portions are finished at substantially the same time.

4. The system of claim 3, wherein the number of print job portions includes a number of sequential print job portions.

5. The system of claim 2, wherein the printing ability of each of the plurality of printers is equal.

6. The system of claim 2, wherein the printing ability of each of the plurality of printers is not equal.

7. The system of claim 2, wherein the print job allocation system minimizes a time required for printing the print job.

8. The system of claim 1, wherein the characteristics of the print job include at least one of a file size of the print job, a format of the print job, a layout of the print job, and a content of the print job.

9. The system of claim 1, wherein the characteristics of the print job include at least one of a paper size and margins for the print job, a number of lines of text in the print job, a number of words in the print job, a number of characters in the print job, a font size and type of the print job, and an image size in the print job.

10. The system of claim 1, wherein the print job distribution system monitors a status of the print job and a performance of the plurality of printers.

11. A method of printing a print job, the method comprising:
  providing a plurality of printers;
  assessing characteristics of the print job and a printing ability of the plurality of printers;
  dividing the print job into a number of print job portions each having a print job weight; and
  distributing the print job portions among a number of printers of the plurality of printers based on the characteristics of the print job and the printing ability of the plurality of printers,
  wherein the number of printers complete the print job portions at substantially the same time, and
  wherein the print job weight of each of the print job portions is substantially equal.

12. The method of claim 11, wherein distributing the print job includes assessing a printing ability of the plurality of printers to print the print job and allocating the print job among the number of printers based on the characteristics of the print job and the printing ability of the plurality of printers.

13. The method of claim 12, wherein distributing the print job includes dividing the print job into a number of print job portions each having a print job weight and allocating the number of print job portions among the number of printers such that all of the print job portions are finished at substantially the same time.

14. The method of claim 13, wherein the number of print job portions includes a number of sequential print job portions.

15. The method of claim 12, wherein the printing ability of each of the plurality of printers is equal.

16. The method of claim 12, wherein the printing ability of each of the plurality of printers is not equal.

17. The method of claim 12, wherein distributing the print job includes minimizing a time required for printing the print job.

18. The method of claim 11, wherein assessing the characteristics of the print job includes assessing at least one of a file size of the print job, a format of the print job, a layout of the print job, and a content of the print job.

19. The method of claim 11, wherein assessing the characteristics of the print job includes assessing at least one of a paper size and margins for the print job, a number of lines of text in the print job, a number of words in the print job, a number of characters in the print job, a font size and type of the print job, and an image size in the print job.

20. The method of claim 11, wherein distributing the print job includes monitoring a status of the print job and a performance of the plurality of printers.

21. A system for producing a book on-demand, the system comprising:
  a processing system adapted to receive and process a book request for the book, the processing system to retrieve a data file which includes contents of the book and produce a book body preparation command and a book cover preparation command from the data file;
  a book block preparation system which prepares a book block of the book in response to the book body preparation command;
  a book cover preparation system which prepares a book cover of the book in response to the book cover preparation command; and
  a book finishing, system which assembles the book block and the book cover to form the book,
  wherein the book block preparation system prints the book block as a print job, and wherein the book block preparation system includes a plurality of printers and a print job distribution system which distributes the print job among a number of printers of the plurality of printers, wherein the print job distribution system divides the print job into a number of print job portions each having a print job weight and allocates the number of print job portions among the number of printers,
  wherein all the print job portions are finished at substantially the same time, and wherein the print job weight of each of the print job portions is substantially equal.

22. The system of claim 21, wherein the print job distribution system includes a print job assessment system which assesses a weight of the print job, a printer ability assessment system which assesses a printing ability of the plurality of printers to print the print job, and a print job allocation system which allocates the print job among the number of printers based on the weight of the print job and the printing ability of the plurality of printers.

23. The system of claim 21, wherein the number of print job portions includes a number of sequential print job portions.

24. A method of producing a book on-demand, the method comprising:
  receiving and processing a book request for the book including retrieving a data file which includes contents of the book and producing a book body preparation command and a book cover preparation command from the data file;
  preparing a book cover of the book in response to the book cover preparation command; and
  assembling the book block and the book cover to form the book,
  wherein preparing the book block includes printing the book block as a print job, and wherein preparing the book block includes providing a plurality of printers and distributing the print job among a number of printers of the plurality of printers, wherein distributing the print job includes dividing the print job into a number of print job portions each having a print job weight and allocating the number of print job portions among the number of printers, wherein all of the print job portions arm finished at substantially the same time, and wherein the paint job weight of each of the print job portions is substantially equal.

25. The method of claim 24, wherein distributing the print job includes assessing a weight of the job, assessing a printing ability of the plurality of printers to print the print job, and allocating the print job among the number of printers based on the weight of the print job and the printing ability of the plurality of printers.

26. The method of claim 24, wherein the number of print job portions includes a number of sequential print job portions.

* * * * *

UNITED STATES PATENT AND TRADEMARK OFFICE
CERTIFICATE OF CORRECTION

PATENT NO. : 6,970,261 B1
APPLICATION NO. : 09/613700
DATED : November 29, 2005
INVENTOR(S) : Rogelio Robles It is certified that error appears in the above-identified patent and that said Letters Patent is hereby corrected as shown below:

In column 8, line 17, in Claim 21, after "system" insert -- adapted --.

In column 8, line 28, in Claim 21, delete "finishing," and insert -- finishing --, therefor.

In column 8, line 60, in Claim 24, after "file;" insert -- preparing a book block of the book in response to the book body preparation command; --.

In column 9, line 8, in Claim 24, delete "arm" and insert -- are --, therefor.

In column 9, line 9, in Claim 24, delete "paint" and insert -- print --, therefor.

In column 10, line 2, in Claim 25, after "of the" insert -- print --.

Signed and Sealed this

Eleventh Day of August, 2009

David J. Kappos
*Director of the United States Patent and Trademark Office*